(12) United States Patent
Lv et al.

(10) Patent No.: US 9,936,491 B2
(45) Date of Patent: Apr. 3, 2018

(54) DATA SENDING METHOD, DATA RECEIVING METHOD, BASE STATION AND USER EQUIPMENT

(71) Applicant: Huawei Technologies Co., Ltd., Shenzhen, Guangdong (CN)

(72) Inventors: Yongxia Lv, Beijing (CN); Wen Zhang, Shenzhen (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/336,636

(22) Filed: Jul. 21, 2014

(65) Prior Publication Data
US 2014/0348089 A1 Nov. 27, 2014

Related U.S. Application Data

(63) Continuation of application No. PCT/CN2012/077982, filed on Jun. 30, 2012.

(30) Foreign Application Priority Data

Jan. 21, 2012 (CN) .......................... 2012 1 0019863

(51) Int. Cl.
*H04W 72/04* (2009.01)
*H04L 5/00* (2006.01)
*H04W 74/00* (2009.01)

(52) U.S. Cl.
CPC ......... *H04W 72/042* (2013.01); *H04L 5/0012* (2013.01); *H04L 5/0044* (2013.01); *H04L 5/0053* (2013.01); *H04W 74/006* (2013.01); *H04W 72/0446* (2013.01)

(58) Field of Classification Search
CPC ... H04W 72/04; H04W 4/22; H04W 72/0446; H04W 28/06; H04W 76/046
See application file for complete search history.

(56) References Cited

U.S. PATENT DOCUMENTS

2009/0086670 A1* 4/2009 Hart .................... H04W 72/042
370/329
2009/0088148 A1 4/2009 Chung et al.
(Continued)

FOREIGN PATENT DOCUMENTS

CN 102075947 A 5/2011
CN 102170703 A 8/2011
(Continued)

OTHER PUBLICATIONS

"On enhanced PDCCH design," 3GPP TSG-RAN WG1 #66bis, Zhuhai, China, R1-112928, 3$^{rd}$ Generation Partnership Project, Valbonne, France (Oct. 10-14, 2011).
(Continued)

*Primary Examiner* — Anez Ebrahim
(74) *Attorney, Agent, or Firm* — Leydig, Voit & Mayer, Ltd.

(57) ABSTRACT

Embodiments of the present invention provide a data sending method. The data sending method includes: determining, according to location generation information of a PDCCH on a non-legacy resource, a resource location, on a subframe, of the PDCCH on the non-legacy resource; and sending the subframe to a UE, where the PDCCH on the non-legacy resource is contained on the resource location of the subframe, so that the UE determines the resource location, on the subframe, of the PDCCH on the non-legacy resource according to the location generation information. In the embodiments of the present invention, both the base station and the UE may determine a resource location of the PDCCH on the non-legacy resource separately by using the location generation information, thereby avoiding a circumstance that the UE equipped with only the capability of receiving a PDCCH on a non-legacy resource cannot access a network.

40 Claims, 3 Drawing Sheets

(56) References Cited

U.S. PATENT DOCUMENTS

| | | | |
|---|---|---|---|
| 2010/0165847 A1 | 7/2010 | Kamuf et al. | |
| 2010/0195524 A1* | 8/2010 | Iwamura | H04W 76/048 370/252 |
| 2010/0279628 A1 | 11/2010 | Love et al. | |
| 2010/0290384 A1* | 11/2010 | Maheshwari | H04W 72/042 370/329 |
| 2011/0103338 A1* | 5/2011 | Astely | H04J 11/0069 370/329 |
| 2011/0161778 A1* | 6/2011 | Kim | H03M 13/6306 714/758 |
| 2011/0249633 A1 | 10/2011 | Hong et al. | |
| 2012/0327876 A1 | 12/2012 | Ouchi et al. | |
| 2013/0121300 A1* | 5/2013 | Cho | H04W 72/042 370/329 |
| 2014/0177556 A1 | 6/2014 | Pan et al. | |

FOREIGN PATENT DOCUMENTS

| | | |
|---|---|---|
| CN | 102202324 A | 9/2011 |
| CN | 102202400 A | 9/2011 |
| CN | 102215094 A | 10/2011 |
| EP | 2717639 A1 | 4/2014 |
| JP | 2010541367 A | 12/2010 |
| JP | 2012508483 A | 4/2012 |
| JP | 2013527663 A | 6/2013 |
| WO | WO 2010053984 A2 | 5/2010 |
| WO | WO 2010076300 A1 | 7/2010 |
| WO | WO 2011126212 A2 | 10/2010 |
| WO | WO 2011096261 A1 | 8/2011 |

OTHER PUBLICATIONS

"Design Consideration for E-PDCCH," 3GPP TSG RAN WG1 Meeting #66bis, Zhuhai, China, R1-113236, 3$^{rd}$ Generation Partnership Project, Valbonne, France (Oct. 10-14, 2011).

"The VU-ePDCCH design framework," 3GPP TSG RAN WG1 Meeting #67, San Francisco, USA, R1-113691, 3$^{rd}$ Generation Partnership Project, Valbonne, France (Nov. 14-18, 2011).

"Considerations on the ePDCCH design," 3GPP TSG RAN WG1 Meeting #67, San Francisco, USA, R1-113655, 3rd Generation Partnership Project, Valbonne, France (Nov. 14-18, 2011).

* cited by examiner

DATA SENDING METHOD, DATA RECEIVING METHOD, BASE STATION AND USER EQUIPMENT

CROSS-REFERENCE TO RELATED APPLICATIONS

This application is a continuation of International Patent Application No. PCT/CN2012/077982, filed on Jun. 30, 2012, which claims priority to Chinese Patent Application No. 201210019863.4, filed on Jan. 21, 2012, both of which are hereby incorporated by reference in their entireties.

FIELD OF THE INVENTION

Embodiments of the present invention relate to communications technologies, and in particular, to a data sending method, a data receiving method, a base station and a user equipment.

BACKGROUND OF THE INVENTION

To improve system performances, in an existing long term evolution (LTE) system, a base station (eNodeB for short hereinafter) may schedule and allocate resources according to a channel situation of a user equipment (UE).

Specifically, the eNodeB may send a physical downlink shared channel (PDSCH) and a corresponding physical downlink control channel (PDCCH) for each scheduled UE, where the PDSCH bears data sent by the eNodeB to the UE, and the PDCCH is mainly used for indicating a transmission format of the PDSCH corresponding to the PDCCH. The PDCCH on a legacy resource fully occupies the entire frequency band on a frequency domain, and occupies the first several orthogonal frequency division multiplexing (OFDM) symbols of a first time slot of each subframe on a time domain, while the remaining OFDM symbols are used for transmitting the PDSCH. The number of PDCCHs which a subframe can support is limited, and the number of UEs scheduled in the subframe is also limited, so in the prior art, a part of resources transmitting the PDSCH are obtained through partition to transmit the PDCCH on the non-legacy resource; the PDCCH on the non-legacy resource does not need to fully occupy the entire frequency band, so PDCCHs on non-legacy resources of a plurality of UEs may be transmitted in a subframe, thereby increasing the number of scheduled UEs. Currently, some UEs are equipped with a capability of receiving a PDCCH on a legacy resource on the full frequency band, while some UEs are only equipped with a capability of receiving a PDCCH on a non-legacy resource.

However, the inventor finds in practice that, in a procedure that a UE accesses a network, if a base station transmits control information of a PDSCH by using a PDCCH on a non-legacy resource, a circumstance that the UE cannot access the network frequently occurs when the UE is equipped with only the capability of receiving a PDCCH on a non-legacy resource.

SUMMARY OF THE INVENTION

Embodiments of the present invention provide a data sending method, a data receiving method, a base station and a user equipment.

An embodiment of the present invention provides a data sending method, including:

determining, according to location generation information of a PDCCH on a non-legacy resource, a resource location, on a subframe, of the PDCCH on the non-legacy resource; and sending the subframe to a UE, where the PDCCH on the non-legacy resource is contained on the resource location of the subframe, so that the UE determines the resource location, on the subframe, of the PDCCH on the non-legacy resource according to the location generation information.

An embodiment of the present invention provides a data receiving method, including:

receiving a subframe sent by a base station, where the subframe contains a PDCCH on a non-legacy resource; and determining, according to location generation information of the PDCCH on the non-legacy resource, a resource location, on the subframe, of the PDCCH on the non-legacy resource.

An embodiment of the present invention provides a base station, including:

a determining module, configured to determine, according to location generation information of a PDCCH on a non-legacy resource, a resource location, on a subframe, of the PDCCH on the non-legacy resource; and a sending module, configured to send the subframe to a UE, where the PDCCH on the non-legacy resource is contained on the resource location of the subframe, so that the UE determines the resource location, on the subframe, of the PDCCH on the non-legacy resource according to the location generation information.

An embodiment of the present invention further provides a user equipment, including:

a receiving module, configured to receive a subframe sent by a base station, where the subframe contains a PDCCH on a non-legacy resource; and a determining module, configured to determine, according to location generation information of the PDCCH on the non-legacy resource, a resource location, on the subframe, of the PDCCH on the non-legacy resource.

An embodiment of the present invention provides another data sending method, including:

sending, on a PDCCH on a non-legacy resource, downlink control information to a UE, where the downlink control information contains resource location information of a PDCCH on a next non-legacy resource.

An embodiment of the present invention provides another data receiving method, including:

receiving, on a PDCCH on a non-legacy resource, downlink control information, where the downlink control information contains resource location information of a PDCCH on a next non-legacy resource.

An embodiment of the present invention provides another base station, including:

a sending module, configured send, on a PDCCH on a non-legacy resource, downlink control information to a UE, where the downlink control information contains resource location information of a PDCCH on a next non-legacy resource.

An embodiment of the present invention provides another user equipment, including:

a receiving module, configured to receive, on a PDCCH on a non-legacy resource, downlink control information, where the downlink control information contains resource location information of a PDCCH on a next non-legacy resource.

In the embodiments of the present invention, the base station may determine the resource location, on the subframe, of the PDCCH on the non-legacy resource by using the location generation information, then place, on the resource location of the subframe, the PDCCH on the non-legacy resource, and send the subframe to the UE, and after receiving the subframe, the UE may also determine the resource location, on the subframe, of the PDCCH on the non-legacy resource by using the location generation information. Therefore, in the embodiments of the present invention, no matter whether the UE is currently in a procedure for accessing a network or has accessed a network, and also no matter whether the UE is only equipped with a capability of receiving a PDCCH on a non-legacy resource or equipped with a capability of receiving a PDCCH on a legacy resource on the full frequency band, both the base station and the UE may determine a resource location of the PDCCH on the non-legacy resource separately by using the location generation information, thereby avoiding a circumstance that the UE equipped with only the capability of receiving a PDCCH on a non-legacy resource cannot access a network.

BRIEF DESCRIPTION OF THE DRAWINGS

To describe the technical solutions in embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
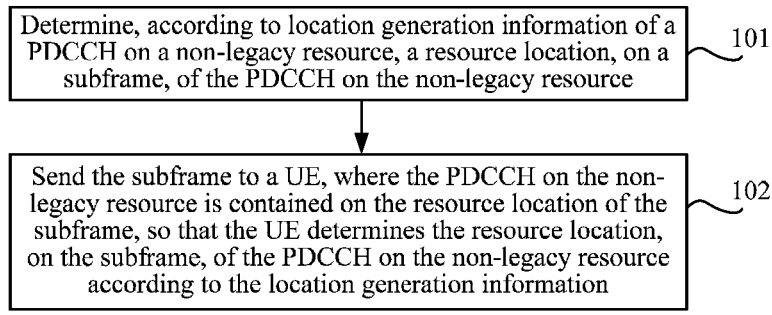
FIG. 1 is a flow chart of Embodiment 1 of a data sending method according to the present invention.

FIG. 1 is a flow chart of Embodiment 1 of a data sending method of the present invention. As shown in FIG. 1, the method of this embodiment may include the following steps:

Step 101: Determine, according to location generation information of a PDCCH on a non-legacy resource, a resource location, on a subframe, of the PDCCH on the non-legacy resource.

Step 102: Send the subframe to a UE, where the PDCCH on the non-legacy resource is contained on the resource location of the subframe, so that the UE determines the resource location, on the subframe, of the PDCCH on the non-legacy resource according to the location generation information.

Specifically, in this embodiment, a PDCCH on a non-legacy resource refers to a PDCCH placed on a location, on a subframe, except for a legacy resource location of a PDCCH on a legacy resource, for example, an enhanced PDCCH (E-PDCCH) stipulated in an LTE related standard is a PDCCH on a non-legacy resource. In the prior art, for a UE that has accessed a network, namely, a UE being in a connected state, a resource location occupied by a PDCCH on a non-legacy resource may be notified by a base station to the UE by using high level signaling, while for some UEs, the UEs may be required to learn a resource location of a PDCCH on a non-legacy resource corresponding to system information of the accessed network in a procedure for accessing a network. The base station may contain, in a PDCCH of a legacy resource, indication information of the resource location of the PDCCH on the non-legacy resource, so the UE equipped with the capability of receiving a PDCCH on a legacy resource on the full frequency band may receive the PDCCH on the legacy resource on the full frequency band in the procedure for accessing a network, and determine the resource location of the PDCCH on the non-legacy resource according to the indication information contained in the PDCCH on the legacy resource. However, the UE equipped with only the capability of receiving the PDCCH on the non-legacy resource cannot receive the PDCCH on the legacy resource on the full frequency band in the procedure for accessing a network, and cannot learn the resource location of the PDCCH on the non-legacy resource, so the circumstance that the UE cannot access the network occurs.

Therefore, in this embodiment, a base station, such as eNodeB may determine the resource location, on the subframe, of the PDCCH on the non-legacy resource according to the location generation information of the PDCCH on the non-legacy resource, and the location generation information may be information learned in advance by both the base station and the UE. For example, the base station determines the resource location, on the subframe, of the PDCCH on the non-legacy resource by using the location generation information by default, while the UE may determine the resource location, on the subframe, of the PDCCH on the non-legacy resource by using the location generation information by default. After determining the resource location, on the subframe, of the PDCCH on the non-legacy resource, the base station may send the subframe to the UE, and the PDCCH on the non-legacy resource may be contained on the resource location in the subframe, so that after receiving the subframe, the UE may also determine the resource location, on the subframe, of the PDCCH on the non-legacy resource by using the corresponding location generation information. Therefore, no matter whether the UE is currently in a procedure for accessing a network or has accessed a network, and also no matter whether the UE is only equipped with a capability of receiving a PDCCH on a non-legacy resource or equipped with a capability of receiving a PDCCH on a legacy resource on the full frequency band, both the base station and the UE may determine a resource location of the PDCCH on the non-legacy resource separately by using the location generation information, thereby avoiding a circumstance that the UE equipped with only the capability of receiving a PDCCH on a non-legacy resource cannot access a network.

It should be noted that, whether the location generation information used by the PDCCH on the non-legacy resource is the same or different is not limited in this embodiment, and it should be understood by persons skilled in the art that, for a case that the location generation information is the same, the base station may place, on a fixed resource location on a subframe, the PDCCH on the non-legacy resource, while the UE may also obtain the PDCCH on the non-legacy resource from the fixed resource location on the received subframe; for a case that the location generation information is different, the base station may place, on different resource locations on the subframe, PDCCHs on different non-legacy resources according to a preset placement rule, where in the specific placement rule, the UE may be notified in advance, and after receiving the subframe, the UE may also obtain the PDCCHs on the non-legacy resources from the resource locations corresponding to the subframe according to the placement rule learned in advance.

In this embodiment, the base station may determine the resource location, on the subframe, of the PDCCH on the non-legacy resource by using the location generation information, then place, on the resource location of the subframe, the PDCCH on the non-legacy resource, and send the subframe to the UE, and after receiving the subframe, the UE may also determine the resource location, on the subframe, of the PDCCH on the non-legacy resource by using the location generation information. Therefore, in this embodiment, no matter whether the UE is currently in a procedure for accessing a network or has accessed a network, and also no matter whether the UE is only equipped with a capability of receiving a PDCCH on a non-legacy resource or equipped with a capability of receiving a PDCCH on a legacy resource on the full frequency band, both the base station and the UE may determine a resource location of the PDCCH on the non-legacy resource separately by using the location generation information, thereby avoiding a circumstance that the UE equipped with only the capability of receiving a PDCCH on a non-legacy resource cannot access a network.

During specific implementation, the base station may determine, according to the location generation information of the PDCCH on the non-legacy resource, the resource location, on the subframe, of the PDCCH on the non-legacy resource by using the following several solutions:

Solution 1: Determine the resource location, on the subframe, of the PDCCH on the non-legacy resource by using a preset value of a system Specifically, the location generation information used in the solution is a preset value of the system, and the preset value is learned in advance by both the base station and the UE, so the base station may determine the resource location, on the subframe, of the PDCCH on the non-legacy resource according to the preset value, and accordingly, after receiving the subframe, the UE may also determine the resource location, on the subframe, of the PDCCH on the non-legacy resource according to the preset value. This solution is simple in the implementation manner, and is easy in the operation.

Solution 2: When the UE is in a connected state, determine the resource location, on the subframe, of the PDCCH on the non-legacy resource by using the UE-related information and/or frame-, subframe- or time slot-related information Specifically, if the UE is in the connected state, namely, the UE has accessed a network, the UE has obtained the UE-related information allocated by the network side, and the UE-related information may be learned by both the base station and the UE. Therefore, the base station may determine the resource location, on the subframe, of the PDCCH on the non-legacy resource by using the UE-related information as the location generation information.

In this solution, the UE-related information may include at least one of the following information:

a UE identifier (UE-ID), a UE group identifier (UE-group ID), a UE specific value notified by a high level (UE specific), and a UE group specific value notified by a high level (UE-group specific).

Furthermore, the base station and the UE may also learn the frame-, subframe- or time slot-related information to be transmitted, so in this solution, the base station may further determine the resource location, on the subframe, of the PDCCH on the non-legacy resource by using the frame-, subframe- or time slot-related information.

The frame-, subframe- or time slot-related information may include at least one of the following information:

a frame number, a subframe number, a time slot number, a subframe group number, a subframe period and a subframe offset.

Preferably, the base station may also determine the resource location, on the subframe, of the PDCCH on the non-legacy resource by using a combination of the UE-related information and the frame-, subframe- or time slot-related information as the location generation information.

Much further, in this solution, an identifier of a cell where the UE is located may also be used as the location generation information, and accordingly, the location generation information used by the base station may be of the following several forms:

Manner 1: UE-related information;

Manner 2: frame-, subframe- or time slot-related information;

Manner 3: UE-related information and cell identifier;

Manner 4: frame-, subframe- or time slot-related information, and cell identifier;

Manner 5: UE-related information, and frame-, subframe- or time slot-related information; and Manner 6: UE-related information, frame-, subframe- or time slot-related information, and cell identifier.

Solution 3: When the UE is in an idle state, determine the resource location, on the subframe, of the PDCCH on the non-legacy resource by using the frame-, subframe- or time slot-related information Specifically, when the UE is in the idle state, namely, the UE has not yet accessed the network or is in the procedure for accessing the network, the UE has not yet learned the UE-related information allocated by the network side, so in such case, the base station may determine the resource location, on the subframe, of the PDCCH on the non-legacy resource by using the frame-, subframe- or time slot-related information.

Alternatively, the base station may further determine the resource location, on the subframe, of the PDCCH on the non-legacy resource through a combination of the frame-, subframe- or time slot-related information and the identifier of the cell where the UE is located.

The inventor further finds in practice that, the PDCCH on the non-legacy resource loses the frequency diversity gain of the PDCCH on the legacy resource, and reliability reduction of the control channel may be caused mainly due to the reason that the PDCCH on the legacy resource occupies the full frequency band, while the PDCCH on the non-legacy resource only occupies a part of the frequency band.

To achieve the object that the frequency diversity gain can also be obtained at the time of transmitting the control information by using the PDCCH on the non-legacy resource, in the technical solution of the present invention, on the basis of the foregoing method embodiment, step 101 may specifically be: determining, according to the location generation information, a resource location, on the subframe, of the PDCCH on the non-legacy resource in a frequency hopping manner; and step 102 may specifically be: transmitting, on the subframe, the PDCCH on the non-legacy resource by using the frequency hopping manner.

Further, for the PDSCH corresponding to the PDCCH on the non-legacy resource, the base station may bind and transmit the PDCCH on the non-legacy resource and the PDSCH corresponding to the PDCCH by using the same frequency hopping manner, and the PDCCH on the non-legacy resource may contain corresponding resource location indication information, indicating a location offset of the PDSCH relative to the PDCCH on the non-legacy resource.

Furthermore, the frequency hopping manner of the PDCCH on the non-legacy resource may be learned in advance by both the base station and the UE, or may be learned by the base station but not learned by the UE. If the UE does not learn the frequency hopping manner in which the base station transmits the PDCCH on the non-legacy resource, the base station may contain, in the PDCCH on the non-legacy resource of the current frame, resource location information of a PDCCH on a next non-legacy resource, thereby indicating a resource location of the PDCCH on the next non-legacy resource for the UE, or, the base station may contain, in a radio resource control (RRC) message sent to the UE, the resource location information of the PDCCH on the next non-legacy resource. The initial location of the PDCCH on the non-legacy resource may be obtained by using the location generation information of the preceding embodiment.

When transmission is performed by using the frequency hopping manner of binding the PDCCH on the non-legacy resource and the PDSCH, the UE may not perform downlink channel measurement, and may not feed channel quality information (CQI) back to the eNodeB, while the PDSCH may transmit downlink data by using a preset modulation and coding scheme (MCS), such as presetting and using quadrature phase shift keying (QPSK) modulation and ⅓ coding; or using the manner that the UE reports the CQI, and the modulation and coding manner that the MCS domain in the PDCCH on the non-legacy resource may indicate the PDSCH.

At the time of transmitting the PDCCH on the non-legacy resource by using the frequency hopping manner, or at the time of binding and transmitting the PDCCH on the non-legacy resource and the PDSCH, the frequency hopping manner may be predefined, and the base station may perform frequency hopping transmission on the full frequency band or a part of the frequency band by using the frequency hopping manner. Specifically, the base station may determine, according to the location generation information, the resource location, on the subframe, of the PDCCH on the non-legacy resource in the frequency hopping manner.

During specific implementation, if the UE is in the connected state, the frequency hopping manner may be determined according to at least one of the following information:

frame-, subframe- or time slot-related information, including: at least one type of the following information: a frame number, a subframe number, a time slot number and a subframe group number;

UE-related information, including: at least one type of the following information: a UE identifier, a UE-group identifier, a UE specific value notified by a high level, and a UE-group specific value notified by a high level; and a preset value of the system.

If the UE is in the idle state, the frequency hopping manner may be determined according to at least one of the following information:

frame-, subframe- or time slot-related information, including: at least one type of the following information: a frame number, a subframe number, a time slot number and a subframe group number; and a preset value of the system.

Alternatively, no matter whether the UE is in the idle state or the connected state, the UE may further use a cell identifier at the time of determining the frequency hopping manner.

Furthermore, at the time of presetting the frequency hopping manner, the UE may be made to span resource block groups (RBG) of the legacy (legacy for short hereinafter) UE as less as possible, and therefore waste of resource blocks (RB) may be avoided. For example, if the bandwidth supported by the UE is six RBs, when the number of RBG(s) is 1, 2 and 3, the starting point of the frequency hopping should be aligned with the starting point of the RBG of the legacy UE; and when the number of RBGs is 4, the starting point of the frequency hopping should be aligned with the starting point of a first physical resource block (PRB) or a second PRB or a third PRB in the RBG of the legacy UE.

The means for presetting the frequency hopping manner may be to preset a frequency hopping formula used for describing the frequency hopping manner, an example of a frequency hopping formula of a PDCCH on a non-legacy resource is given below, and the PRB of the starting point of the frequency hopping of the PDCCH on the non-legacy resource on subframe No. $n_{subframe}$ is determined through the following formula:

$$n_{PRB}(n_{subframe}) = [(n_0 + f_{hop}(n_{subframe}) +$$
$$((N_{sb} - 1) - 2(n_0 \bmod N_{sb})) \cdot f_m(n_{subframe})) \bmod(N_{sb})] \cdot N_{RB}^{sb}$$

$$f_{hop}(n_{subframe}) = \left( f_{hop}(n_{subframe} - 1) + \right.$$

$$\left. \left( \sum_{k=n_{subframe} \cdot 10+1}^{n_{subframe} \cdot 10+9} c(k) \times 2^{k-(n_{subframe} \cdot 10+1)} \right) \bmod(N_{sb} - 1) + \right.$$

-continued $$1\Bigg\}\mod N_{sb}$$

$$f_{hop}(-1) = 0$$

$$f_m(n_{subframe}) = c(n_{subframe} \cdot 10)$$

where, when the UE has no UE-ID or the UE is in the idle state or has not yet obtained the UE-ID in the initialization access procedure, $n_0$ is a UE-ID, a UE-group ID, or a value of a UE specific or UE-group specific designated by a high level, or may also be a preset value of the system, or a modulus of the UE-ID obtained from a given number. The introduction of $n_0$ may make control information and data information of a plurality of UEs be centralized within a narrow band, thereby improving the resource use ratio, and avoiding that the PDCCH on the non-legacy resource divides the PDSCH resource into many fragments, so that the base station cannot schedule the legacy UE, so as to cause waste of the time frequency resource.

$N_{RB}{}^{sb}$ is the number of RBs contained in the subband, and in the formula, the subband performs frequency hopping within the entire bandwidth. $N_{RB}{}^{sb}$ may be the number of RBs corresponding to the maximum bandwidth supported by the UE, such as six RBs. If $N_{RB}{}^{sb}$ is set to 1, the frequency hopping formula performs scheduling with an RB as the granularity. $N_{sb}$ is the number of subbands, whose value is:

$$N_{sb} = \left\lfloor \frac{N_{PDSCH}}{N_{RB}^{sb}} \right\rfloor$$

$c(\bullet)$ is a pseudo random sequence, and for frame format #1, a pseudo random sequence generator is initialized through the following formula:

$$c_{init} = N_{ID}{}^{cell}$$

where $N_{ID}{}^{cell}$ is a cell identifier. For frame format #2, the pseudo random sequence generator is initialized through the following formula:

$$c_{init} = 2^9 \cdot (n_f \mod 4) + N_{ID}{}^{cell}$$

where $n_f$ is a system frame number. In the formula, the subband performs frequency hopping within the entire bandwidth, $f_m(\bullet)$ determines the starting point of subband mirror image frequency hopping, and $f_{hop}(\bullet)$ determines the offset of the subband frequency hopping.

It should be understood that according to different demands and system plannings, persons skilled in the art may independently design the frequency hopping formula.

Further, after the base station sends a subframe by using the frequency hopping manner, the base station may further adjust a resource location of a PDCCH on a non-legacy resource in a next subframe according to the CQI reported by the UE.

Specifically, the UE may perform downlink channel measurement by using the following three manners:

1. Perform measurement on a subband where a PDCCH on a non-legacy resource is located, obtain CQI and report the CQI to the base station sequentially;

2. Perform measurement on a subband where a PDCCH on a non-legacy resource is located, obtain CQI within a period of time, and then report several pieces of CQI being the best and better to the base station; and 3. Average signal noise ratios (SNR) of a subband within a preset time, obtain an average SNR, then obtain average CQI, and report the average CQI to the base station.

After receiving the CQI reported by the UE, the base station may adjust a resource location of a PDCCH on a non-legacy resource in a next subframe by using the following several manners:

Manner 1: Determine one several subband of several subbands with the best channel quality and better channel quality according to CQI of subbands reported by the UE, and transmit, on this subband, a PDCCH on a next non-legacy resource and a PDSCH corresponding to the PDCCH on the next non-legacy resource.

Once the base station detects that the channel quality of the best subband deteriorates, the base station is required to determine a resource location of the PDCCH on the next non-legacy resource by again using the frequency hopping manner, and then in the frequency hopping procedure, the base station may further search for the best subband again according to the CQI reported by the UE. Channel quality deterioration may be determined according to CQI or hybrid automatic repeat request (HARQ) times reported by the UE.

Furthermore, it should be noted that, at the initial stage that the base station has not received the CQI reported by the UE, the location of the PDSCH may be obtained through a given algorithm, an input variable of the algorithm is a value preset by a high level, which may be the MCS configured or preset by the broadcast, or may also be the MCS roughly selected by the base station according to factors such as algorithm/cell coverage of the base station.

Manner 2: Determine a shrunk frequency hopping range according to CQI reported by the UE, determine a resource location of a PDCCH on a next non-legacy resource in the shrunk frequency hopping range by using the frequency hopping manner, and determine a resource location of a PDSCH corresponding to the PDCCH on the next non-legacy resource in the shrunk frequency hopping range by using a scheduling manner.

After the base station obtains CQI of each subband reported by the UE, the frequency hopping range of the PDCCH on the non-legacy resource may be shrunk, namely, a part of the subband is selected as the frequency hopping range of the PDCCH on the non-legacy resource; subsequently the base station may determine a resource location of a PDCCH on a next non-legacy resource by using the frequency hopping manner on the shrunk frequency hopping range, and a corresponding PDSCH is sent by using the scheduling manner on a subband of the shrunk frequency hopping range. In the sending procedure, the UE may continuously perform channel measurement and CQI reporting on a subband in the shrunk frequency hopping range. The location of the PDSCH may be indicated by using an offset of the PDSCH relative to the PDCCH on the non-legacy resource.

Manner 3: According to CQI reported by the UE and on all subbands of the subframe, determine a resource location of a PDCCH on a next non-legacy resource by using the frequency hopping manner, and determine a resource location of a PDSCH corresponding to the PDCCH on the next non-legacy resource by using a scheduling manner.

After the base station obtains the CQI reported by the UE, the PDCCH on the non-legacy resource still uses the frequency hopping manner of full frequency band, while the corresponding PDSCH may be scheduled and sent on all subbands of the subframe. In the sending procedure, the CQI may also be continuously reported, and the location of the PDSCH may be indicated by using an offset of the PDSCH relative to the PDCCH on the non-legacy resource. Once the base station detects that the channel quality deteriorates, the procedure that the PDCCH on the non-legacy resource searches for the best subband by means of frequency hopping is executed again.

Further, at the same time of transmitting the PDCCH on the non-legacy resource by using the frequency hopping manner, resources used for transmitting an enhanced physical HARQ indicator channel (PHICH) may be hewed out for the UE on an resource element (RE) except for the PDCCH on the legacy resource, for example, the enhanced PHICH may be implemented by puncturing in the PDCCH on the non-legacy resource, and may also be implemented on a special RE except for the PDCCH on the non-legacy resource. The enhanced PHICH and the PDCCH on the non-legacy resource may be bound together and transmitted by means of frequency hopping.

The procedure that the base station sends data is illustrated in detail in the foregoing embodiment, and the procedure that the UE receives data is illustrated in detail below.

Figure 2:
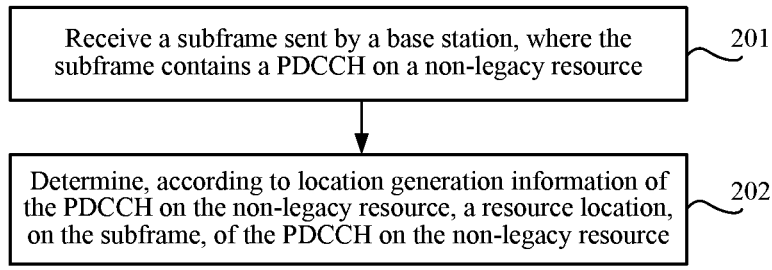
FIG. 2 is a flow chart of an embodiment of a data receiving method according to the present invention.

FIG. 2 is a flow chart of an embodiment of a data receiving method of the present invention. As shown in FIG. 2, the method of this embodiment may include the following steps.

Step 201: Receive a subframe sent by a base station, where the subframe carries a PDCCH on a non-legacy resource.

Step 202: Determine, according to location generation information of the PDCCH on the non-legacy resource, a resource location, on the subframe, of the PDCCH on the non-legacy resource.

In this embodiment, the base station may send the subframe to the UE by using the method embodiment shown in FIG. 1, and after receiving the subframe, the UE may determine the resource location, on the subframe, of the PDCCH on the non-legacy resource according to the location generation information of the PDCCH on the non-legacy resource learned in advance, where the location generation information may be information learned in advance by both the base station and the UE. For example, the base station determines the resource location, on the subframe, of the PDCCH on the non-legacy resource by using the location generation information by default, while the UE may determine the resource location, on the subframe, of the PDCCH on the non-legacy resource by using the location generation information by default. Therefore, no matter whether the UE is currently in a procedure for accessing a network or has accessed a network, and also no matter whether the UE is only equipped with a capability of receiving a PDCCH on a non-legacy resource or equipped with a capability of receiving a PDCCH on a legacy resource on the full frequency band, both the base station and the UE may determine a resource location of the PDCCH on the non-legacy resource separately by using the location generation information, thereby avoiding a circumstance that the UE equipped with only the capability of receiving a PDCCH on a non-legacy resource cannot access a network.

In this embodiment, after receiving the subframe sent by the base station, the UE may determine the resource location, on the subframe, of the PDCCH on the non-legacy resource by using the location generation information. Therefore, in this embodiment, no matter whether the UE is currently in a procedure for accessing a network or has accessed a network, and also no matter whether the UE is only equipped with a capability of receiving a PDCCH on a non-legacy resource or equipped with a capability of receiving a PDCCH on a legacy resource on the full frequency band, both the base station and the UE may determine a resource location of the PDCCH on the non-legacy resource separately by using the location generation information, thereby avoiding a circumstance that the UE equipped with only the capability of receiving a PDCCH on a non-legacy resource cannot access a network.

During specific implementation, the UE may determine, according to the location generation information of the PDCCH on the non-legacy resource, the resource location, on the subframe, of the PDCCH on the non-legacy resource by using the following several solutions:

Solution 1: Determine the resource location, on the subframe, of the PDCCH on the non-legacy resource by using a preset value of a system Specifically, the location generation information used in the solution is a preset value of the system, and the preset value is learned in advance by both the base station and the UE, so after receiving the preset value, the UE may also determine the resource location, on the subframe, of the PDCCH on the non-legacy resource according to the preset value. This solution is simple in the implementation manner, and is easy in the operation.

Solution 2: When the UE is in a connected state, determine the resource location, on the subframe, of the PDCCH on the non-legacy resource by using the UE-related information and/or frame-, subframe- or time slot-related information Specifically, if the UE is in the connected state, namely, the UE has accessed a network, the UE has obtained the UE-related information allocated by the network side, and the UE-related information may be learned by both the base station and the UE. Therefore, the UE may determine the resource location, on the subframe, of the PDCCH on the non-legacy resource by using the UE-related information as the location generation information.

In this solution, the UE-related information may include at least one of the following information:

a UE-ID, a UE-group ID, a UE specific, and a UE-group specific.

Furthermore, the base station and the UE may also learn the frame-, subframe- or time slot-related information to be transmitted, so in this solution, the UE may further determine the resource location, on the subframe, of the PDCCH on the non-legacy resource by using the frame-, subframe- or time slot-related information.

The frame-, subframe- or time slot-related information may include at least one of the following information:

a frame number, a subframe number, a time slot number, a subframe group number, a subframe period and a subframe offset.

Preferably, the UE may also determine the resource location, on the subframe, of the PDCCH on the non-legacy resource by using a combination of the UE-related information and the frame-, subframe- or time slot-related information as the location generation information.

In this solution, an identifier of a cell where the UE is located may also be used as the location generation information, and accordingly, the location generation information used by the UE may be of the following several forms:

Manner 1: UE-related information;

Manner 2: frame-, subframe- or time slot-related information;

Manner 3: UE-related information and cell identifier;

Manner 4: frame-, subframe- or time slot-related information, and cell identifier;

Manner 5: UE-related information, and frame-, subframe- or time slot-related information; and Manner 6: UE-related information, frame-, subframe- or time slot-related information, and cell identifier.

Which manner is specifically used depends on a convention between the base station and the UE, and is not limited in this embodiment.

Solution 3: When the UE is in an idle state, determine the resource location, on the subframe, of the PDCCH on the non-legacy resource by using the frame-, subframe- or time slot-related information Specifically, when the UE is in the idle state, namely, the UE has not yet accessed the network or is in the procedure for accessing the network, the UE has not yet learned the UE-related information allocated by the network side, so in such case, the UE may determine the resource location, on the subframe, of the PDCCH on the non-legacy resource by using the frame-, subframe- or time slot-related information.

Alternatively, the UE may further determine the resource location, on the subframe, of the PDCCH on the non-legacy resource through a combination of the frame-, subframe- or time slot-related information and the identifier of the cell where the UE is located.

To achieve the object that the frequency diversity gain can be obtained at the time of transmitting the control information by using the PDCCH on the non-legacy resource, the base station may send the PDCCH on the non-legacy resource by using the frequency hopping manner, so in the technical solution of the present invention, on the basis of the foregoing method embodiment shown in FIG. 2, step 202 may specifically be: determining, according to the location generation information, a resource location, on the subframe, of the PDCCH on the non-legacy resource in a frequency hopping manner.

Further, for the PDSCH corresponding to the PDCCH on the non-legacy resource, the base station may bind and transmit the PDCCH on the non-legacy resource and the PDSCH corresponding to the PDCCH by using the same frequency hopping manner, so the UE may determine the resource location of the PDSCH corresponding to the PDCCH on the non-legacy resource by using the same frequency hopping manner.

At the time of performing transmission by using the frequency hopping manner, the base station and the UE may stipulate which location generation information is used to determine the frequency hopping manner, thereby determining the resource location of the PDSCH corresponding to the PDCCH on the non-legacy resource, where, the location generation information may also be selected by using the manner described above, which is not described anymore herein.

Furthermore, the frequency hopping manner of the PDCCH on the non-legacy resource may be learned in advance by both the base station and the UE, or may be learned by the base station but not learned by the UE. If the UE does not learn the frequency hopping manner in which the base station transmits the PDCCH on the non-legacy resource, the base station may contain, in the PDCCH on the non-legacy resource of the current frame, resource location information of a PDCCH on a next non-legacy resource, so that the UE may learn the resource location of the PDCCH on the next non-legacy resource according to the resource location information, or, the base station may contain the resource location information of the PDCCH on the next non-legacy resource in the RRC message sent to the UE.

When transmission is performed by using the frequency hopping manner of binding the PDCCH on the non-legacy resource and the PDSCH, the UE may not perform downlink channel measurement, and may not feed CQI back to the eNodeB, while the PDSCH may transmit downlink data by using a preset MCS, such as presetting and using QPSK modulation and ⅓ coding, and accordingly, the UE may also demodulate and decode the PDSCH by using the preset MCS; or, the modulation and coding manner that the UE may also report the CQI, and in the subframe sent by the base station, the MCS domain in the PDCCH on the non-legacy resource may indicate the PDSCH.

At the time of transmitting the PDCCH on the non-legacy resource by using the frequency hopping manner, or at the time of binding and transmitting the PDCCH on the non-legacy resource and the PDSCH, the frequency hopping manner may be predefined, and the base station may perform frequency hopping transmission on the full frequency band or a part of the frequency band by using the frequency hopping manner. Accordingly, the UE may determine, according to the location generation information, the resource location, on the subframe, of the PDCCH on the non-legacy resource in the frequency hopping manner.

During specific implementation, if the UE is in the connected state, the frequency hopping manner may be determined according to at least one of the following information:

frame-, subframe- or time slot-related information, including: at least one type of the following information: a frame number, a subframe number, a time slot number and a subframe group number; and UE-related information, including: at least one type of the following information: a UE identifier, a UE-group identifier, a UE specific value notified by a high level, and a UE-group specific value notified by a high level; and a preset value of the system.

If the UE is in the idle state, the frequency hopping manner may be determined according to at least one of the following information:

frame-, subframe- or time slot-related information, including: at least one type of the following information: a frame number, a subframe number, a time slot number and a subframe group number; and a preset value of the system.

Alternatively, no matter whether the UE is in the idle state or the connected state, the UE may further use a cell identifier at the time of determining the frequency hopping manner.

During specific implementation, the frequency hopping manner may also be described by using a frequency hopping formula, the UE may learn the resource location of the PDCCH on the non-legacy resource according to the frequency hopping formula, the specific implementation is the same as the implementation of the base station side, which is not described anymore herein.

Further, after the base station sends a subframe by using the frequency hopping manner, the base station may further adjust a resource location of a PDCCH on a non-legacy resource in a next subframe according to the CQI reported by the UE.

Therefore, the UE may perform downlink channel measurement by using the following three manners:

1. Perform measurement on a subband where a PDCCH on a non-legacy resource is located, obtain CQI and report the CQI to the base station sequentially;

2. Perform measurement on a subband where a PDCCH on a non-legacy resource is located, obtain CQI within a period of time, and then report several pieces of CQI being the best and better to the base station; and 3. Average SNRs of a subband within a preset time, obtain an average SNR, then obtain average CQI, and report the average CQI to the base station.

After receiving the CQI reported by the UE, the base station may adjust a resource location of a PDCCH on a non-legacy resource in a next subframe by using the following several manners:

Manner 1: Determine one several subband of several subbands with the best channel quality and better channel quality according to CQI of subbands reported by the UE, and transmit, on this subband, a PDCCH on a next non-legacy resource and a PDSCH corresponding to the PDCCH on the next non-legacy resource.

Once the base station detects that the channel quality of the best subband deteriorates, the base station is required to determine a resource location of the PDCCH on the next non-legacy resource by again using the frequency hopping manner, and then in the frequency hopping procedure, the base station may further search for the best subband again according to the CQI reported by the UE. Channel quality deterioration may be determined according to CQI or HARQ times reported by the UE.

Manner 2: Determine a shrunk frequency hopping range according to CQI reported by the UE, determine a resource location of a PDCCH on a next non-legacy resource in the shrunk frequency hopping range by using the frequency hopping manner, and determine a resource location of a PDSCH corresponding to the PDCCH on the next non-legacy resource in the shrunk frequency hopping range by using a scheduling manner.

After the base station obtains CQI of each subband reported by the UE, the frequency hopping range of the PDCCH on the non-legacy resource may be shrunk, namely, a part of the subband is selected as the frequency hopping range of the PDCCH on the non-legacy resource; subsequently the base station may determine a resource location of a PDCCH on a next non-legacy resource by using the frequency hopping manner on the shrunk frequency hopping range, and a corresponding PDSCH is sent by using the scheduling manner on a subband of the shrunk frequency hopping range. In the sending procedure, the UE may continuously perform channel measurement and CQI reporting on a subband in the shrunk frequency hopping range. The location of the PDSCH may be indicated by using an offset of the PDSCH relative to the PDCCH on the non-legacy resource.

Manner 3: According to CQI reported by the UE and on all subbands of the subframe, determine a resource location of a PDCCH on a next non-legacy resource by using the frequency hopping manner, and determine a resource location of a PDSCH corresponding to the PDCCH on the next non-legacy resource by using a scheduling manner.

After the base station obtains the CQI reported by the UE, the PDCCH on the non-legacy resource still uses the frequency hopping manner of full frequency band, while the corresponding PDSCH may be scheduled and sent on all subbands of the subframe. In the sending procedure, the CQI may also be continuously reported, and the location of the PDSCH may be indicated by using an offset of the PDSCH relative to the PDCCH on the non-legacy resource. Once the base station detects that the channel quality deteriorates, the procedure that the PDCCH on the non-legacy resource searches for the best subband by means of frequency hopping is executed again.

Based on the foregoing three adjustment manners of the base station, accordingly, the UE may also learn according to the CQI reported by the UE that the base station adjusts a PDCCH on a next non-legacy resource and a resource location of a PDSCH corresponding to the PDCCH on the next non-legacy resource, so the UE may obtain the PDCCH on the next non-legacy resource on a corresponding resource location and the resource location of the PDSCH corresponding to the PDCCH on the next non-legacy resource.

Much further, at the same time of transmitting the PDCCH on the non-legacy resource by using the frequency hopping manner, the base station may hew out resources used for transmitting an enhanced PHICH for the UE on an RE except for the PDCCH on the legacy resource, for example, the enhanced PHICH may be implemented by puncturing in the PDCCH on the non-legacy resource, and may also be implemented on a special RE except for the PDCCH on the non-legacy resource. The enhanced PHICH and the PDCCH on the non-legacy resource may be bound together and transmitted by means of frequency hopping. Therefore, the UE may determine a resource location of an enhanced PHICH on a location on the subframe except for a resource location of a PDCCH on a legacy resource according to the frequency hopping manner.

In another embodiment of the present invention, in the uplink sending procedure for the UE, a physical uplink shared channel (PUSCH) and a physical uplink control channel (PUCCH) may also be transmitted by using the frequency hopping manner, and accordingly, both the base station and the UE may determine resource locations of the PUSCH and the PUCCH by using the frequency hopping manner.

An example of a frequency hopping formula of the PUSCH is given below, and the size of a subband may be the maximum bandwidth supported by the UE, such as $N_{RB}^{sb}=6$ RBs. If $N_{RB}^{sb}=1$, the scheduling formula performs scheduling with an RB as the granularity. During frequency hopping, the subband performs frequency hopping on the entire bandwidth, $f_m(\cdot)$ determines the starting point of subband mirror image frequency hopping, and $f_{hop}(\cdot)$ determines the offset of the subband frequency hopping. PRB $n_{PRB}(n_s)$ of the starting point of frequency hopping of the PUSCH of time slot No. $n_s$ is determined through the following formula:

$$\tilde{n}_{PRB}(n_s) = $$
$$[(\tilde{n}_{VRB} + f_{hop}(i) + ((N_{sb} - 1) - 2(\tilde{n}_{VRB} \bmod N_{sb})) \cdot f_m(i)) \bmod(N_{sb})] \cdot N_{RB}^{sb}$$

$$i = \begin{cases} \lfloor n_s/2 \rfloor & \text{inter} - \text{subframe hopping} \\ n_s & \text{intra and inter} - \text{subframe hopping} \end{cases}$$

$$n_{PRB}(n_s) = \tilde{n}_{PRB}(n_s) + \lceil N_{RB}^{HO}/2 \rceil$$

$$\tilde{n}_{VRB} = n_{VRB} - \lceil N_{RB}^{HO}/2 \rceil$$

$$f_{hop}(n_s) = \left( f_{hop}(n_s - 1) + \left( \sum_{k=n_s \cdot 10+1}^{n_s \cdot 10+9} c(k) \times 2^{k-(n_s \cdot 10+1)} \right) \bmod(N_{sb} - 1) + 1 \right) \bmod N_{sb}$$

$$f_{hop}(-1) = 0$$

$$f_m(n_s) = c(n_s \cdot 10)$$

where, $N_{RB}^{HO}$ is a value given by an upper level, and a value of $n_{VRB}$ derives from authorization of uplink scheduling. $N_{sb}$ is the number of subbands, whose value is:

$$N_{RB}^{sb} = \lfloor (N_{RB}^{UL} - N_{RB}^{HO} - N_{RB}^{HO} \bmod 2)/N_{sb} \rfloor$$

c(•) is a pseudo random sequence, and for frame format #1, a pseudo random sequence generator is initialized through the following formula:

$$c_{init}=N_{ID}^{cell}$$

where, $N_{ID}^{cell}$ is a cell-ID. For frame format #2, the pseudo random sequence generator is initialized through the following formula:

$$c_{init}=2^{9}\cdot(n_f \bmod 4)+N_{ID}^{cell}$$

where $n_f$ is a system frame number.

Two time slots, in a subframe, of a PUCCH of the UE respectively occupy PRBs at two ends of the entire subband. A frequency hopping formula of the PUCCH may be obtained by slightly modifying the frequency hopping of the above PUSCH. An example is given below on the basis of the above formula.

If $n_s$ is 0 or an even number, the PRB of the frequency hopping of the PUCCH of the time slot No. $n_s$ is decided through the following formula:

$$n_{PRB}(n_s)=[(\tilde{n}_{VRB}+f_{hop}(i)+((N_{sb}-1)-2(\tilde{n}_{VRB} \bmod N_{sb}))\cdot f_m(i)) \bmod (N_{sb})]\cdot N_{RB}^{sb}$$

$$i=n_s/2$$

If $n_s$ is an odd number, the PRB of the frequency hopping of the PUCCH of the time slot No. $n_s$ is decided through the following formula:

$$n_{PRB}(n_s)=n_{PRB}(n_s-1)+N_{sb}-1$$

Figure 3:
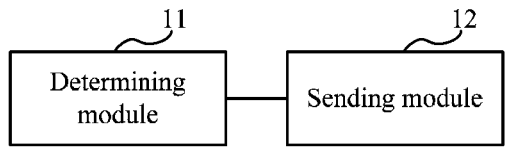
FIG. 3 is a schematic structural diagram of Embodiment 1 of a base station according to the present invention.

FIG. 3 is a schematic structural diagram of Embodiment 1 of a base station of the present invention. As shown in FIG. 3, the base station of this embodiment may include: a determining module 11 and a sending module 12, where, the determining module 11 is configured to determine, according to location generation information of a PDCCH on a non-legacy resource, a resource location, on a subframe, of the PDCCH on the non-legacy resource; and the sending module 12 is configured to send the subframe to a UE, where the PDCCH on the non-legacy resource is contained on the resource location of the subframe, so that the UE determines the resource location, on the subframe, of the PDCCH on the non-legacy resource according to the location generation information.

The base station of this embodiment may be configured to execute the technical solution of the method embodiment shown in FIG. 1, and the implementation principle and the technical effect of this embodiment are similar to those of the method embodiments, which are not described anymore herein.

Specifically, the determining module 11 may be specifically configured to determine, according to the location generation information, a resource location, on the subframe, of the PDCCH on the non-legacy resource in a frequency hopping manner; and the sending module 12 may be specifically configured to transmit, on the subframe, the PDCCH on the non-legacy resource by using the frequency hopping manner, and the sending module 12 may be further configured to transmit a PDSCH corresponding to the PDCCH on the non-legacy resource by using the frequency hopping manner.

In the foregoing embodiment of the base station of the present invention, the PDCCH on the non-legacy resource may further contain resource location indication information of the PDSCH, and the resource location indication information indicates a location offset of the PDSCH relative to the PDCCH on the non-legacy resource.

The PDCCH on the non-legacy resource contains resource location information of a PDCCH on a next non-legacy resource, or an RRC message sent to the UE contains resource location information of a PDCCH on a next non-legacy resource.

A starting point of the frequency hopping of the PDCCH on the non-legacy resource is aligned with a starting point of a resource block group of a legacy UE.

An enhanced PHICH is further contained on a location, on the subframe, except for a resource location of a PDCCH on a legacy resource, and the enhanced PHICH and the PDCCH on the non-legacy resource are transmitted together by means of frequency hopping.

The base station shown in FIG. 3 is illustrated in detail below by using several specific embodiments.

Figure 4:
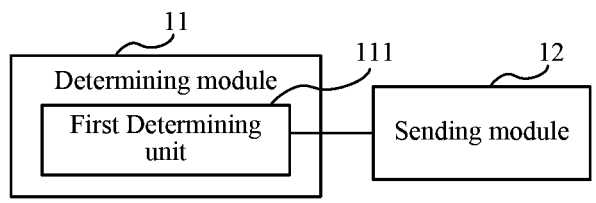
FIG. 4 is a schematic structural diagram of Embodiment 2 of a base station according to the present invention.

FIG. 4 is a schematic structural diagram of Embodiment 2 of a base station of the present invention. As shown in FIG. 4, the base station of this embodiment is based on the base station shown in FIG. 3, and further, the determining module 11 may include: a first determining unit 111, configured to determine, according to a preset value used for generating location information of the PDCCH on the non-legacy resource, the resource location, on the subframe, of the PDCCH on the non-legacy resource.

The base station of this embodiment may be configured to execute Solution 1 used in the method embodiment shown in FIG. 1 at the time of specifically determining the resource location, and the implementation principle and the technical effect of this embodiment are similar to those of the method embodiment, which are not described anymore herein.

Figure 5:
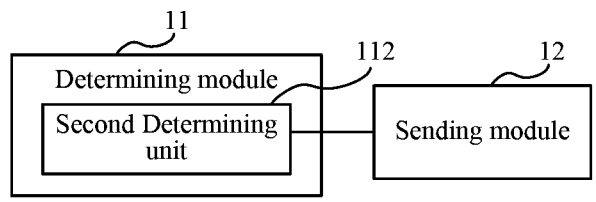
FIG. 5 is a schematic structural diagram of Embodiment 3 of a base station according to the present invention.

FIG. 5 is a schematic structural diagram of Embodiment 3 of a base station of the present invention. As shown in FIG. 5, the base station of this embodiment is based on the base station shown in FIG. 3, and further, the determining module 11 may include: a second determining unit 112, configured to determine, according to UE-related information and/or frame-, subframe- or time slot-related information used for generating location information of the PDCCH on the non-legacy resource, the resource location, on the subframe, of the PDCCH on the non-legacy resource.

The UE-related information may include:

at least one type of the following information: a UE identifier, a UE-group identifier, a UE specific value notified by a high level, and a UE-group specific value notified by a high level.

The frame-, subframe- or time slot-related information includes:

at least one type of the following information: a frame number, a subframe number, a time slot number, a subframe group number, a subframe period and a subframe offset.

Alternatively, the location generation information may further use a cell identifier.

The base station of this embodiment may be configured to execute Solution 2 used in the method embodiment shown in FIG. 1 at the time of specifically determining the resource location, and the implementation principle and the technical effect of this embodiment are similar to those of the method embodiment, which are not described anymore herein.

Figure 6:
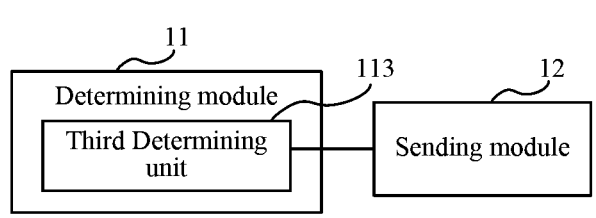
FIG. 6 is a schematic structural diagram of Embodiment 4 of a base station according to the present invention.

FIG. 6 is a schematic structural diagram of Embodiment 4 of a base station of the present invention. As shown in FIG. 6, the base station of this embodiment is based on the base station shown in FIG. 3, and further, the determining module 11 may include: a third determining unit 113, configured to determine the resource location, on the subframe, of the PDCCH on the non-legacy resource according to frame-, subframe- or time slot-related information.

The frame-, subframe- or time slot-related information includes:

at least one type of the following information: a frame number, a subframe number, a time slot number, a subframe group number, a subframe period and a subframe offset.

Alternatively, the location generation information may further use a cell identifier.

The base station of this embodiment may be configured to execute Solution 3 used in the method embodiment shown in FIG. 1 at the time of specifically determining the resource location, and the implementation principle and the technical effect of this embodiment are similar to those of the method embodiment, which are not described anymore herein.

Figure 7:
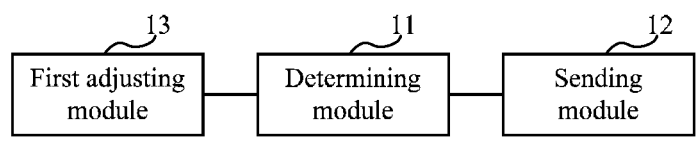
FIG. 7 is a schematic structural diagram of Embodiment 5 of a base station according to the present invention.

FIG. 7 is a schematic structural diagram of Embodiment 5 of a base station of the present invention. As shown in FIG. 7, the base station of this embodiment is based on the base station shown in FIG. 3, and further includes: a first adjusting module 13, configured to determine one several subband of several subbands with the best channel quality and better channel quality according to channel quality information reported by the UE, and transmit, on the subband, a PDCCH on a next non-legacy resource and a PDSCH corresponding to the PDCCH on the next non-legacy resource. Further, the first adjusting module 13 is further configured to detect channel quality of the subband, and if the channel quality deteriorates, determine a resource location of the PDCCH on the next non-legacy resource by using the frequency hopping manner again.

The base station of this embodiment may be configured to execute Manner 1 used in the method embodiment shown in FIG. 1 at the time of specifically adjusting the resource location, and the implementation principle and the technical effect of this embodiment are similar to those of the method embodiment, which are not described anymore herein.

Figure 8:
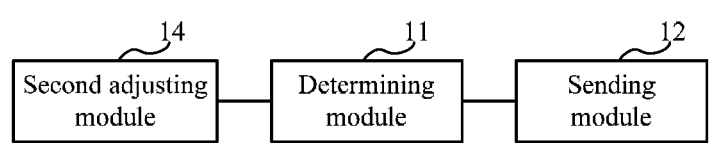
FIG. 8 is a schematic structural diagram of Embodiment 6 of a base station according to the present invention.

FIG. 8 is a schematic structural diagram of Embodiment 6 of a base station of the present invention. As shown in FIG. 8, the base station of this embodiment is based on the base station shown in FIG. 3, and further includes: a second adjusting module 14, configured to determine a shrunk frequency hopping range according to channel quality information reported by the UE, determine a resource location of a PDCCH on a next non-legacy resource in the shrunk frequency hopping range by using the frequency hopping manner, and determine a resource location of a PDSCH corresponding to the PDCCH on the next non-legacy resource in the shrunk frequency hopping range by using a scheduling manner.

The base station of this embodiment may be configured to execute Manner 2 used in the method embodiment shown in FIG. 1 at the time of specifically adjusting the resource location, and the implementation principle and the technical effect of this embodiment are similar to those of the method embodiment, which are not described anymore herein.

Figure 9:
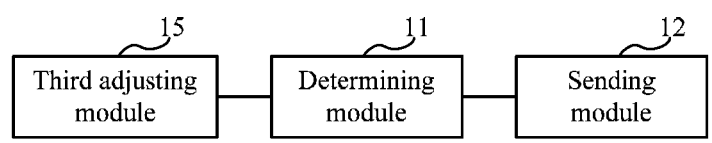
FIG. 9 is a schematic structural diagram of Embodiment 7 of a base station according to the present invention.

FIG. 9 is a schematic structural diagram of Embodiment 7 of a base station of the present invention. As shown in FIG. 9, the base station of this embodiment is based on the base station shown in FIG. 3, and further includes: a third adjusting module 15, configured to, according to channel quality information reported by the UE and on all subbands of the subframe, determine a resource location of a PDCCH on a next non-legacy resource by using the frequency hopping manner, and determine a resource location of a PDSCH corresponding to the PDCCH on the next non-legacy resource by using a scheduling manner.

The base station of this embodiment may be configured to execute Manner 3 used in the method embodiment shown in FIG. 1 at the time of specifically adjusting the resource location, and the implementation principle and the technical effect of this embodiment are similar to those of the method embodiment, which are not described anymore herein.

Figure 10:
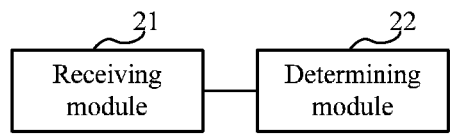
FIG. 10 is a schematic structural diagram of Embodiment 1 of a user equipment according to the present invention.

FIG. 10 is a schematic structural diagram of Embodiment 1 of a user equipment of the present invention. As shown in FIG. 10, the UE of this embodiment may include: a receiving module 21 and a determining module 22, where, the receiving module 21 is configured to receive a subframe sent by a base station, where the subframe contains a PDCCH on a non-legacy resource; and the determining module 22 is configured to determine, according to location generation information of the PDCCH on the non-legacy resource, a resource location, on the subframe, of the PDCCH on the non-legacy resource.

The UE of this embodiment may be configured to execute the technical solution of the method embodiment shown in FIG. 2, and the implementation principle and the technical effect of this embodiment are similar to those of the method embodiment, which are not described anymore herein.

Specifically, the determining module 22 is specifically configured to determine, according to the location generation information, a resource location, on the subframe, of the PDCCH on the non-legacy resource in a frequency hopping manner, and the determining module 22 is further configured to determine a resource location of a PDSCH corresponding to the PDCCH on the non-legacy resource by using the frequency hopping manner.

The base station shown in FIG. 3 is illustrated in detail below by using several specific embodiments.

Figure 11:
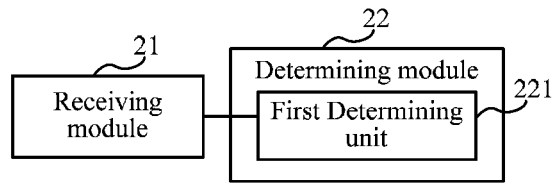
FIG. 11 is a schematic structural diagram of Embodiment 2 of a user equipment according to the present invention.

FIG. 11 is a schematic structural diagram of Embodiment 2 of a user equipment of the present invention. As shown in FIG. 11, the UE of this embodiment is based on the UE shown in FIG. 10, and further, the determining module 22 includes: a first determining unit 221, configured to determine, according to a preset value used for generating location information of the PDCCH on the non-legacy resource, the resource location, on the subframe, of the PDCCH on the non-legacy resource.

The UE of this embodiment may be configured to execute Solution 1 used in the method embodiment shown in FIG. 2 at the time of specifically determining the resource location, and the implementation principle and the technical effect of this embodiment are similar to those of the method embodiment, which are not described anymore herein.

Figure 12:
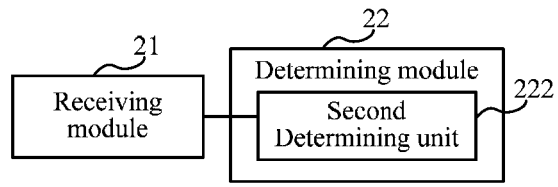
FIG. 12 is a schematic structural diagram of Embodiment 3 of a user equipment according to the present invention.

FIG. 12 is a schematic structural diagram of Embodiment 3 of a user equipment of the present invention. As shown in FIG. 12, the UE of this embodiment is based on the UE shown in FIG. 10, and further, the determining module 22 includes: a second determining unit 222, configured to determine, according to UE-related information and/or frame-, subframe- or time slot-related information used for generating location information of the PDCCH on the non-legacy resource, the resource location, on the subframe, of the PDCCH on the non-legacy resource.

The UE-related information may include:

at least one type of the following information: a UE identifier, a UE-group identifier, a UE specific value notified by a high level, and a UE-group specific value notified by a high level.

The frame-, subframe- or time slot-related information includes:

at least one type of the following information: a frame number, a subframe number, a time slot number, a subframe group number, a subframe period and a subframe offset.

Alternatively, the location generation information may further use a cell identifier.

The UE of this embodiment may be configured to execute Solution 2 used in the method embodiment shown in FIG. 2 at the time of specifically determining the resource location, and the implementation principle and the technical effect of this embodiment are similar to those of the method embodiment, which are not described anymore herein.

Figure 13:
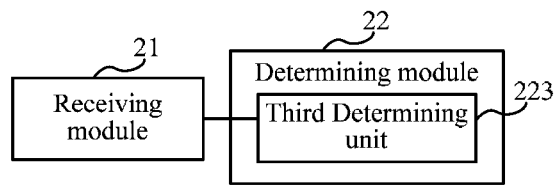
FIG. 13 is a schematic structural diagram of Embodiment 4 of a user equipment according to the present invention.

FIG. 13 is a schematic structural diagram of Embodiment 4 of a user equipment of the present invention. As shown in FIG. 13, the UE of this embodiment is based on the UE shown in FIG. 10, and further, the determining module 22 includes: a third determining unit 223, configured to determine the resource location, on the subframe, of the PDCCH on the non-legacy resource according to frame-, subframe- or time slot-related information.

The frame-, subframe- or time slot-related information includes:

at least one type of the following information: a frame number, a subframe number, a time slot number, a subframe group number, a subframe period and a subframe offset.

Alternatively, the location generation information may further use a cell identifier.

The UE of this embodiment may be configured to execute Solution 3 used in the method embodiment shown in FIG. 2 at the time of specifically determining the resource location, and the implementation principle and the technical effect of this embodiment are similar to those of the method embodiment, which are not described anymore herein.

Figure 14:
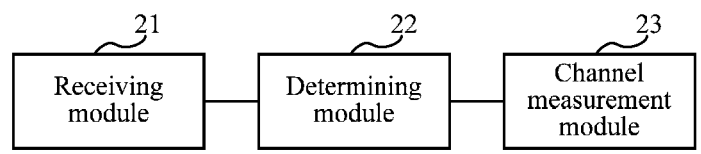
FIG. 14 is a schematic structural diagram of Embodiment 5 of a user equipment according to the present invention.

FIG. 14 is a schematic structural diagram of Embodiment 5 of a user equipment of the present invention. As shown in FIG. 14, the UE of this embodiment is based on the UE shown in FIG. 10, and further includes: a channel measurement module 23, configured to perform channel measurement on each subband where the PDCCH on the non-legacy resource is located, obtain channel quality information of each subband, and send the channel quality information to the base station. The determining module 22 is further configured to receive a PDCCH on a next non-legacy resource and a PDSCH corresponding to the PDCCH on the next non-legacy resource on one several subband of several subbands with the best channel quality and better channel quality determined according to the channel quality information, or receive a PDCCH on a next non-legacy resource sent by the base station on a frequency hopping range shrunk according to the channel quality information or on a full frequency range by using the frequency hopping manner.

Furthermore, the determining module 22 is further configured to determine the resource location of the PDSCH according to resource location indication information of the PDSCH contained in the PDCCH on the non-legacy resource, where the resource location indication information indicates a location offset of the PDSCH relative to the PDCCH on the non-legacy resource, and additionally, determine a resource location of an enhanced PHICH on a location on the subframe except for a resource location of a PDCCH on a legacy resource according to the frequency hopping manner.

The UE of this embodiment may be configured to execute the three manners used in the method embodiment shown in FIG. 2 at the time of specifically adjusting the resource location, and the implementation principle and the technical effect of this embodiment are similar to those of the method embodiment, which are not described anymore herein.

Embodiment 8 provides a data sending method. Downlink control information is sent on a PDCCH on a non-legacy resource, where the downlink control information contains resource location information of a PDCCH on a next non-legacy resource. That is to say, a resource location of the PDCCH on the non-legacy resource where the downlink control information sent in this subframe is located is indicated in a previous piece of downlink control information, so that a dynamic scheduling gain of the PDCCH on the non-legacy resource can be obtained. Furthermore, before the foregoing method, the downlink control information is sent, or a medium access control protocol data unit (MAC PDU) is sent on a preset resource location of the PDCCH on the non-legacy resource, where the MAC PDU contains the resource location information of the PDCCH on the next non-legacy resource. The MAC PDU may be an MAC PDU of a random access response (RAR), and may also be another newly defined MAC PDU. In this embodiment, specific illustration is made by taking the MAC PDU of the RAR as an example, but the method in this embodiment is not limited to the MAC PDU of the RAR. The resource location information of the PDCCH on the next non-legacy resource in the sent MAC PDU of the RAR may be one of the following several types:

1. The resource location information of the PDCCH on the next non-legacy resource is a function of a temporary cell-radio network temporary identifier (TC-RNTI) in the sent MAC RAR, where the function is preset by the system. Alternatively, correspondence exists between the resource location information of the PDCCH on the next non-legacy resource and the function of the TC-RNTI in the sent MAC RAR, and the correspondence is preset by the system. For example, a TC-RNTI in an interval is corresponding to a resource location of a PDCCH on a non-legacy resource.

2. A vacant bit in the MAC RAR of the MAC PDU is used to indicate the resource location of the PDCCH on the next non-legacy resource, for example, there are two preset resource locations of the PDCCH on the non-legacy resource, and one vacant bit indicates a preset resource location of the two preset resource locations. The correspondence between the vacant bit and the two preset resource locations of the PDCCH on the non-legacy resource is preset by the system.

3. A sub-header is added to an MAC header of the MAC PDU, a random access preamble identifier (RAPID) domain in the sub-header indicates a special random access sequence, and a special random access sequence may be notified through a broadcast message, or preset by the system. The MAC RAR corresponding to the sub-header contains the resource location information of the PDCCH on the next non-legacy resource. Further, the MAC RAR may be placed at the end of the entire MAC PDU so as to save bits.

4. The resource location information of the PDCCH on the next non-legacy resource is placed at any location of the MAC PDU. The placement location is preset by the system.

Embodiment 9: A data receiving method. Downlink control information is received on a PDCCH on a non-legacy resource, where the downlink control information contains resource location information of a PDCCH on a next non-legacy resource. That is to say, a resource location of the PDCCH on the non-legacy resource where the downlink control information received by this subframe is located is indicated in a previous piece of downlink control information, so that a dynamic scheduling gain of the PDCCH on the non-legacy resource can be obtained. Furthermore, before the foregoing method, the downlink control information is received or an MAC PDU is received on a preset resource location of the PDCCH on the non-legacy resource, where the MAC PDU contains the resource location information of the PDCCH on the next non-legacy resource. The MAC PDU may be an MAC PDU of an RAR, or may be another newly defined MAC PDU. In this embodiment, specific illustration is made by taking the MAC PDU of the RAR as an example, but the method in this embodiment is not limited to the MAC PDU of the RAR. The resource location information of the PDCCH on the next non-legacy resource in the received MAC PDU of the RAR may be one of the following several types:

1. The resource location information of the PDCCH on the next non-legacy resource is a function of a TC-RNTI in the received MAC RAR, where the function is preset by the system. Alternatively, correspondence exists between the resource location information of the PDCCH on the next non-legacy resource and the function of the TC-RNTI in the received MAC RAR, and the correspondence is preset by the system. For example, a TC-RNTI in an interval is corresponding to a resource location of a PDCCH on a non-legacy resource.
2. A vacant bit in the MAC RAR in the received MAC PDU indicates the resource location of the PDCCH on the next non-legacy resource, for example, there are two preset resource locations of the PDCCH on the non-legacy resource, and one vacant bit indicates a preset resource location of the two preset resource locations. The correspondence between the vacant bit and the two preset resource locations of the PDCCH on the non-legacy resource is preset by the system.
3. A sub-header is added to an MAC header of the received MAC PDU, an RAPID domain in the sub-header indicates a special random access sequence, and a special random access sequence may be obtained by receiving a broadcast message, or preset by the system. The MAC RAR corresponding to the sub-header contains the resource location information of the PDCCH on the next non-legacy resource.
4. The resource location information of the PDCCH on the next non-legacy resource is received at a preset location of the MAC PDU.

Embodiment 10 provides a base station. The base station of this embodiment includes a sending module. The sending module is configured send, on a PDCCH on a non-legacy resource, downlink control information, where the downlink control information contains resource location information of a PDCCH on a next non-legacy resource. That is to say, a resource location of the PDCCH on the non-legacy resource where the downlink control information sent by the base station in this subframe is located is indicated in a previous piece of downlink control information, so that a dynamic scheduling gain of the PDCCH on the non-legacy resource can be obtained. The base station of this embodiment stores the sent resource location information of the PDCCH on the next non-legacy resource. Furthermore, before the foregoing method, the base station of this embodiment sends the downlink control information or sends an MAC PDU on a preset resource location of the PDCCH on the non-legacy resource, where the MAC PDU contains the resource location information of the PDCCH on the next non-legacy resource. The MAC PDU may be an MAC PDU of an RAR, or may be another newly defined MAC PDU. In this embodiment, specific illustration is made by taking the MAC PDU of the RAR as an example, but the method in this embodiment is not limited to the MAC PDU of the RAR. The resource location information of the PDCCH on the next non-legacy resource in the MAC PDU of the RAR sent by the base station of this embodiment may be one of the following several types:

1. The resource location information of the PDCCH on the next non-legacy resource is a function of a TC-RNTI in the MAC RAR sent by the base station of this embodiment, where the function is preset by the system. Alternatively, correspondence exists between the resource location information of the PDCCH on the next non-legacy resource and the function of the TC-RNTI in the MAC RAR sent by the base station of this embodiment, and the correspondence is preset by the system. For example, a TC-RNTI in an interval is corresponding to a resource location of a PDCCH on a non-legacy resource.
2. The base station of this embodiment uses a vacant bit in the MAC RAR of the MAC PDU to indicate the resource location of the PDCCH on the next non-legacy resource, for example, there are two preset resource locations of the PDCCH on the non-legacy resource, and one vacant bit indicates a preset resource location of the two preset resource locations. The correspondence between the vacant bit and the two preset resource locations of the PDCCH on the non-legacy resource is preset by the system.
3. The base station of this embodiment adds a sub-header to an MAC header of the MAC PDU, an RAPID domain in the sub-header indicates a special random access sequence, and a special random access sequence may be notified through a broadcast message, or preset by the system. The MAC RAR corresponding to the sub-header contains the resource location information of the PDCCH on the next non-legacy resource. Further, the base station of this embodiment may place the MAC RAR at the end of the entire MAC PDU so as to save bits.
4. The base station of this embodiment places the resource location information of the PDCCH on the next non-legacy resource at any location of the MAC PDU. The placement location is preset by the system.

Embodiment 11 provides a user equipment. The user equipment in this embodiment includes a receiving module. The receiving module is configured to receive, on a PDCCH on a non-legacy resource, downlink control information, where the downlink control information contains resource location information of a PDCCH on a next non-legacy resource. That is to say, a resource location of the PDCCH on the non-legacy resource where the downlink control information received by the user equipment in this subframe is located is indicated in a previous piece of downlink control information, so that a dynamic scheduling gain of the PDCCH on the non-legacy resource can be obtained. The user equipment of this embodiment stores the received resource location information of the PDCCH on the next non-legacy resource. Furthermore, before the foregoing method, the user equipment in this embodiment receives the downlink control information or receives an MAC PDU on a preset resource location of the PDCCH on the non-legacy resource, where the MAC PDU contains the resource location information of the PDCCH on the next non-legacy resource. The MAC PDU may be an MAC PDU of an RAR, or may be another newly defined MAC PDU. In this embodiment, specific illustration is made by taking the MAC PDU of the RAR as an example, but the method in this embodiment is not limited to the MAC PDU of the RAR. The resource location information of the PDCCH on the next non-legacy resource in the MAC PDU of the RAR received by the user equipment of this embodiment may be one of the following several types: The resource location information of the PDCCH on the next non-legacy resource is a function of a TC-RNTI in the MAC RAR received by the user equipment of this embodiment, where the function is preset by the system. Alternatively, correspondence exists between the resource location information of the PDCCH on the next non-legacy resource and the function of the TC-RNTI in the MAC RAR received by the user equipment of this embodiment, and the correspondence is preset by the system. For example, a TC-RNTI in an interval is corresponding to a resource location of a PDCCH on a non-legacy resource.

A vacant bit in the MAC RAR in the MAC PDU received by the user equipment of this embodiment uses indicates the resource location of the PDCCH on the next non-legacy resource, for example, there are two preset resource locations of the PDCCH on the non-legacy resource, and one vacant bit indicates a preset resource location of the two preset resource locations. The correspondence between the vacant bit and the two preset resource locations of the PDCCH on the non-legacy resource is preset by the system.

A sub-header is added to an MAC header of the MAC PDU received by the user equipment of this embodiment, an RAPID domain of the sub-header indicates a special random access sequence, and a special random access sequence may be obtained by the user equipment of this embodiment by receiving a broadcast message, or preset by the system. The MAC RAR corresponding to the sub-header contains the resource location information of the PDCCH on the next non-legacy resource.

The user equipment in this embodiment receives the resource location information of the PDCCH on the next non-legacy resource at a preset location of the MAC PDU.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as ROM, RAM, magnetic disk, or optical disc.

Finally, it should be noted that, the foregoing embodiments are merely intended for describing the technical solutions of the present invention other than limiting the present invention. Although the present invention is described in detail with reference to the foregoing embodiments, persons of ordinary skill in the art should understood that they may still make modifications to the technical solutions described in the foregoing embodiments, or make equivalent replacements to part of the technical features thereof, without departing from the scope of the technical solutions of the embodiments of the present invention.

What is claimed is:

1. A data sending method comprising:
    sending, by a base station, a medium access control protocol data unit (MAC PDU), wherein the MAC PDU comprises a resource location information of a physical downlink control channel (PDCCH) on a next non-legacy resource;
    determining, by the base station, to dynamically schedule the PDCCH on a subframe, wherein the base station determines, according to the resource location information of the PDCCH on the next non-legacy resource, information of resource location, on the subframe, of the PDCCH on the next non-legacy resource; and
    sending, by the base station, the subframe to a user equipment (UE), wherein the subframe contains the PDCCH on the non-legacy resource,
    wherein a sub-header in a MAC header of the MAC PDU includes a random access preamble identifier (RAPID) domain indicating a special random access sequence.

2. The method according to claim 1, wherein the MAC PDU further comprises a function of a temporary cell-radio network temporary identifier (TC-RNTI).

3. The method according to claim 1, wherein a vacant bit of the MAC PDU is used to indicate the resource location of the PDCCH on the next non-legacy resource.

4. The method according to claim 3, wherein the correspondence between the vacant bit and the two preset resource locations of the PDCCH on the non-legacy resource is preset by the system.

5. The method according to claim 1, wherein the MAC PDU corresponding to the sub-header contains the resource location information of the PDCCH on the next non-legacy resource.

6. The method according to claim 5, wherein the special random access sequence is notified through a broadcast message or preset by the system.

7. The method according to claim 1, wherein the resource location information of the PDCCH on the next non-legacy resource is placed at the MAC PDU.

8. The method according to claim 1, wherein a correspondence exists between the resource location information of the PDCCH on the next non-legacy resource and the function of the TC-RNTI in the sent MAC RAR, and the correspondence is preset by the system.

9. The method according to claim 1, wherein the MAC PDU is a MAC PDU of a random access response (RAR).

10. A data receiving method comprising:
    receiving, by a user equipment (UE) a medium access control protocol data unit (MAC PDU), wherein the MAC PDU comprises resource location information of a physical downlink control channel (PDCCH) on a next non-legacy resource;
    receiving, by the UE, a subframe, wherein the subframe contains the PDCCH on the non-legacy resource, wherein the PDCCH is dynamically scheduled on the subframe according to the resource location information of the PDCCH on the next non-legacy resource; and
    determining, by the UE, according to the information of resource location, a resource location on the subframe of the PDCCH on the non-legacy resource,
    wherein a sub-header in a MAC header of the MAC PDU includes a random access preamble identifier (RAPID) domain indicating a special random access sequence.

11. The method according to claim 10, wherein the resource location information of the PDCCH on the next non-legacy resource is a function of a TC-RNTI in the received MAC PDU.

12. The method according to claim 10, wherein a vacant bit in the received MAC PDU indicates the resource location of the PDCCH on the next non-legacy resource.

13. The method according to claim 10, wherein a correspondence between the vacant bit and the two preset resource locations of the PDCCH on the non-legacy resource is preset by a system.

14. The method according to claim 10, wherein the MAC PDU corresponding to the sub-header contains the resource location information of the PDCCH on the next non-legacy resource.

15. The method according to claim 14, wherein the special random access sequence is obtained by a receiving broadcast message or presetting by the system.

16. The method according to claim 10, wherein the resource location information of the PDCCH on the next non-legacy resource is received at presetting location of the MAC PDU.

17. The method according to claim 10, wherein a correspondence exists between the resource location information of the PDCCH on the next non-legacy resource and the function of the TC-RNTI in the receiving MAC PDU, and the correspondence is preset by the system.

18. The method according to claim 10, wherein the MAC PDU is a MAC PDU of a random access response (RAR).

19. A data sending apparatus comprising:
- a transmitter configured to send a medium access control protocol data unit (MAC PDU) wherein the MAC PDU comprises resource location information of a physical downlink control channel (PDCCH) on a next non-legacy resource;
- a processor configured to determine to dynamically schedule the PDCCH on a subframe, wherein the processor determines information of resource location, on the subframe, of the PDCCH on the next non-legacy resource, according to the resource location information of the PDCCH on the next non-legacy resource; and
- the transmitter configured to send the subframe to a user equipment (UE), wherein the subframe contains the PDCCH on the non-legacy resource,
- wherein a sub-header in a MAC header of the MAC PDU includes a random access preamble identifier (RAPID) domain indicating a special random access sequence.

20. The data sending apparatus according to claim 19, wherein the MAC PDU further comprises a function of a temporary cell-radio network temporary identifier (TC-RNTI).

21. The data sending apparatus according to claim 19, wherein a vacant bit of the MAC PDU is used to indicate the resource location of the PDCCH on the next non-legacy resource.

22. The data sending apparatus according to claim 19, wherein the correspondence between the vacant bit and the two preset resource locations of the PDCCH on the non-legacy resource is preset by the system.

23. The data sending apparatus according to claim 22, wherein the MAC PDU corresponding to the sub-header contains the resource location information of the PDCCH on the next non-legacy resource.

24. The data sending apparatus according to claim 23, wherein the special random access sequence is notified through a broadcast message or preset by the system.

25. The data sending apparatus according to claim 19, wherein the resource location information of the PDCCH on the next non-legacy resource is placed at the MAC PDU.

26. The data sending apparatus according to claim 25, wherein a correspondence exists between the resource location information of the PDCCH on the next non-legacy resource and the function of the TC-RNTI in the sent MAC RAR, and the correspondence is preset by the system.

27. The data sending apparatus according to claim 19, wherein the MAC PDU is a MAC PDU of a random access response (RAR).

28. A data receiving apparatus comprising:
- a receiver configured to receive a medium access control protocol data unit (MAC PDU), wherein the MAC PDU comprises resource location information of a physical downlink control channel (PDCCH) on a next non-legacy resource;
- the receiver configured to receive a subframe, wherein the subframe contains the PDCCH on the non-legacy resource, wherein the PDCCH is dynamically scheduled on the subframe according to the resource location information of the PDCCH on the next non-legacy resource; and
- a processor configured to determine a resource location on the subframe of the PDCCH on the non-legacy resource, according to the information of resource location,
- wherein a sub-header in a MAC header of the MAC PDU includes a random access preamble identifier (RAPID) domain indicating a special random access sequence.

29. The data receiving apparatus according to claim 28, wherein the resource location information of the PDCCH on the next non-legacy resource is a function of a TC-RNTI in the received MAC PDU.

30. The data receiving apparatus according to claim 28, wherein a vacant bit in the received MAC PDU indicates the resource location of the PDCCH on the next non-legacy resource.

31. The data receiving apparatus according to claim 30, wherein a correspondence between the vacant bit and the two preset resource locations of the PDCCH on the non-legacy resource is preset by a system.

32. The data receiving apparatus according to claim 28, wherein the MAC PDU corresponding to the sub-header contains the resource location information of the PDCCH on the next non-legacy resource.

33. The data receiving apparatus according to claim 32, wherein the special random access sequence is obtained by a receiving broadcast message or presetting by the system.

34. The data receiving apparatus according to claim 28, wherein the resource location information of the PDCCH on the next non-legacy resource is received at presetting location of the MAC PDU.

35. The data receiving apparatus according to claim 28, wherein a correspondence exists between the resource location information of the PDCCH on the next non-legacy resource and the function of the TC-RNTI in the receiving MAC PDU, and the correspondence is preset by the system.

36. The data receiving apparatus according to claim 28, wherein the MAC PDU is a MAC PDU of a random access response (RAR).

37. A non-transitory computer readable medium for sending data, the non-transitory computer readable medium containing program instructions that causes a processor in a base station to perform the method comprising:
- sending a medium access control protocol data unit (MAC PDU), wherein the MAC PDU comprises resource location information of a physical downlink control channel (PDCCH) on a next non-legacy resource;
- determining to dynamically schedule the PDCCH on a subframe, wherein the processor determines, according to the resource location information of the PDCCH on the next non-legacy resource, information of resource location, on the subframe, of the PDCCH on the next non-legacy resource; and
- sending the subframe to a user equipment (UE), wherein the subframe contains the PDCCH on the non-legacy resource,
- wherein a sub-header in a MAC header of the MAC PDU includes a random access preamble identifier (RAPID) domain indicating a special random access sequence.

38. The non-transitory computer readable medium of claim 37, wherein the MAC PDU corresponding to the sub-header contains the resource location information of the PDCCH on the next non-legacy resource.

39. A non-transitory computer readable medium for receiving data, the non-transitory computer readable medium containing program instructions that causes a processor in a user equipment to perform the method comprising:

receiving a medium access control protocol data unit (MAC PDU), wherein the MAC PDU comprises resource location information of a physical downlink control channel (PDCCH) on a next non-legacy resource;

receiving a subframe, wherein the subframe contains the PDCCH on the non-legacy resource, wherein the PDCCH is dynamically scheduled on the subframe according to the resource location information of the PDCCH on the next non-legacy resource; and determining according to the information of resource location, a resource location on the subframe of the PDCCH on the non-legacy resource, wherein a sub-header in a MAC header of the MAC PDU includes a random access preamble identifier (RAPID) domain indicating a special random access sequence.

40. The non-transitory computer readable medium of claim 39, wherein the MAC PDU corresponding to the sub-header contains the resource location information of the PDCCH on the next non-legacy resource.

\* \* \* \* \*